United States Patent
Terao

(10) Patent No.: US 8,831,351 B2
(45) Date of Patent: Sep. 9, 2014

(54) DATA PROCESSING APPARATUS, METHOD FOR CONTROLLING DATA PROCESSING APPARATUS, AND NON-TRANSITORY COMPUTER READABLE STORAGE MEDIUM

(75) Inventor: Yoshihide Terao, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 338 days.

(21) Appl. No.: 13/443,777

(22) Filed: Apr. 10, 2012

(65) Prior Publication Data

US 2012/0263380 A1 Oct. 18, 2012

(30) Foreign Application Priority Data

Apr. 18, 2011 (WO) .................. PCT/JP2011/059564

(51) Int. Cl.
*G06K 9/18* (2006.01)
*H04N 1/00* (2006.01)
*G06F 17/22* (2006.01)
*H04N 1/32* (2006.01)

(52) U.S. Cl.
CPC ........ *G06F 17/2217* (2013.01); *H04N 1/00482* (2013.01); *H04N 2201/3226* (2013.01); *H04N 2201/3215* (2013.01); *H04N 2201/3219* (2013.01); *H04N 1/00331* (2013.01); *H04N 2201/3214* (2013.01); *H04N 2201/3202* (2013.01); *H04N 1/00498* (2013.01); *H04N 1/32106* (2013.01); *H04N 1/00474* (2013.01); H04N 2201/3273 (2013.01); H04N 2201/3274 (2013.01); *H04N 1/0048* (2013.01); *H04N 2201/3216* (2013.01)
USPC ....................................................... 382/182

(58) Field of Classification Search
USPC .......................................... 382/181–182, 305
See application file for complete search history.

(56) References Cited

U.S. PATENT DOCUMENTS

| | | | | |
|---|---|---|---|---|
| 6,721,463 | B2 * | 4/2004 | Naoi et al. ..................... | 382/305 |
| 8,065,134 | B2 * | 11/2011 | Naito et al. ....................... | 704/8 |
| 2004/0030542 | A1 * | 2/2004 | Fuji .................................. | 704/2 |
| 2006/0206305 | A1 * | 9/2006 | Kimura et al. ................... | 704/2 |
| 2006/0217958 | A1 * | 9/2006 | Tagawa et al. ................... | 704/2 |
| 2006/0245005 | A1 * | 11/2006 | Hall et al. ...................... | 358/448 |
| 2010/0104192 | A1 * | 4/2010 | Katsuyama et al. .......... | 382/190 |
| 2011/0244441 | A1 * | 10/2011 | Okabayashi et al. ......... | 434/365 |

FOREIGN PATENT DOCUMENTS

| | | |
|---|---|---|
| JP | 9-134406 A | 5/1997 |
| JP | 2005-182772 A | 7/2005 |
| JP | 2008-077454 A | 4/2008 |

* cited by examiner

*Primary Examiner* — Samir Ahmed
(74) *Attorney, Agent, or Firm* — Canon U.S.A., Inc. IP Division

(57) ABSTRACT

When a display language is different from an OCR language, which is used for document name OCR, the name of a document to be sent may not be correctly displayed on a screen. A data processing apparatus is provided that includes a document name setting unit configured to set a document name including a character string recognized on the basis of document data for the document data generated by a read unit, and a control unit configured to restrain the document name setting unit from setting the document name when a language specified by a character recognition language specifying unit is different from a language specified by a display language setting unit.

11 Claims, 13 Drawing Sheets

FIG. 6A

| DISPLAY LANGUAGE | CHARACTER ENCODING SCHEME |
|---|---|
| JAPANESE | Shift_JIS |
| ENGLISH | Windows-1252 |
| FRENCH | |
| ITALIAN | |
| GERMAN | |
| SPANISH | |
| DUTCH | |
| PORTUGUESE | |
| ALBANIAN | |
| CATALAN | |
| DANISH | |
| FINNISH | |
| ICELANDIC | |
| NORWEGIAN | |
| SWEDISH | |
| CROATIAN | Windows-1250 |
| CZECH | |
| HUNGARIAN | |
| POLISH | |
| SLOVAK | |
| SLOVENE | |
| ESTONIAN | Windows-1257 |
| LATVIAN | |
| LITHUANIAN | |
| RUSSIAN | Windows-1251 |
| BULGARIAN | |
| GREEK | Windows-1253 |
| TURKISH | Windows-1254 |
| CHINESE (TRADITIONAL) | BIG5 |
| CHINESE (SIMPLIFIED) | GB18030 |
| KOREAN | KSC5601 |

FIG. 6B

| OCR LANGUAGE | CHARACTER ENCODING SCHEME |
|---|---|
| JAPANESE | Shift_JIS |
| ENGLISH | Windows-1252 |
| FRENCH | |
| ITALIAN | |
| GERMAN | |
| SPANISH | |
| DUTCH | |
| PORTUGUESE | |
| ALBANIAN | |
| CATALAN | |
| DANISH | |
| FINNISH | |
| ICELANDIC | |
| NORWEGIAN | |
| SWEDISH | |
| CROATIAN | Windows-1250 |
| CZECH | |
| HUNGARIAN | |
| POLISH | |
| SLOVAK | |
| ESTONIAN | Windows-1257 |
| LATVIAN | |
| LITHUANIAN | |
| RUSSIAN | Windows-1251 |
| GREEK | Windows-1253 |
| TURKISH | Windows-1254 |
| CHINESE (TRADITIONAL) | BIG5 |
| CHINESE (SIMPLIFIED) | GB18030 |
| KOREAN | KSC5601 |

FIG. 10

| HISTORY (DETAIL) | |
|---|---|
| START TIME: | 2010 12/17 08:59 |
| END TIME: | 2010 12/17 09:00 |
| DESTINATION: | ¥¥server1¥folder1 |
| SEND DOC.NAME: | MEETING |
| PAGES: | 1 |
| SIZE: | 38 KB |

1001

CLOSE

DATA PROCESSING APPARATUS, METHOD FOR CONTROLLING DATA PROCESSING APPARATUS, AND NON-TRANSITORY COMPUTER READABLE STORAGE MEDIUM

BACKGROUND OF THE INVENTION

1. Field of the Invention

The present invention relates to a data processing apparatus, a method for controlling a data processing apparatus, and a non-transitory computer readable storage medium that are configured to set a document name for electronic document data generated by reading an original.

2. Description of the Related Art

There has been known a technique of performing character recognition processing (hereinafter referred to as "OCR (Optical Character Recognition)") on electronic document data generated through scanning in a data processing apparatus, such as a digital multifunction peripheral (MFP) or scanner. Also, there has been generally known a technique of setting a character string extracted by performing OCR as a document name of the document data (see Japanese Patent Laid-Open No. 9-134406 which is discussed below).

Furthermore, there has been known a technique of allowing a user to specify the type of language (for example, Japanese, English, etc., hereinafter referred to as a "language") before performing OCR, and performing OCR using the specified language. By performing OCR using the specified language, character recognition accuracy can be increased in the OCR.

According to another example of the related art, in a case where electronic document data generated through scanning has been sent to a specified destination, the document name of the sent document data may be displayed on a send history screen, together with items such as a sender and the date and time of sending. Such a practice of displaying a document name set for document data on a digital MFP has been generally performed. In the case of displaying characters of a document name or the like on a digital MFP, the characters are normally displayed in a language that has been set using a language setting in an operation unit of the digital MFP.

A document name of document data, the document name being a character string extracted through OCR and set as a document name using a method according to Japanese Patent Laid-Open No. 9-134406, may be displayed on a digital MFP, as described above. An example of such a case is displaying a document name of sent document data on a send history screen. In this case, character codes assigned to characters recognized through OCR in a specified language may not be assigned to the character encoding scheme of the language that has been set in a language setting in an operation unit of the digital MFP.

For example, assuming a case where the language specified before performing OCR is "Japanese" and the language set in the language setting in the operation unit of the digital MFP is "English". In this case, the codes of characters extracted through OCR with a language of Japanese include codes that are not assigned to the character encoding scheme of English (for example, Windows-1252). Thus, character garbling may occur when a user tries to display a set document name in a language of English on the digital MFP.

Character garbling also occurs when the code of a character recognized in a specified language is assigned to a different character in the character encoding scheme of the language that is set in the language setting in the operation unit of the digital MFP.

An aspect of the present invention is to provide, in view of the above-described problems, a feature for performing appropriate processing when the code of a character recognized in character recognition processing is not assigned to the character encoding scheme of the language that is set in a language setting in an operation unit.

SUMMARY OF THE INVENTION

In order to achieve the above-described aspect, a data processing apparatus according to the present invention includes an input unit configured to input document data, a character recognition unit configured to perform, on the document data input by the input unit, character recognition using a specified language, a document name setting unit configured to set, as at least part of a document name of the document data input by the input unit, a character string recognized by the character recognition unit, a display unit configured to display, on an operation unit, the document name set by the document name setting unit, and a control unit configured to restrain the display unit from displaying the document name including the character string set by the document name setting unit, when a character encoding scheme specified in a case where character recognition is performed by the character recognition unit is a character encoding scheme incompatible with a character encoding scheme of a language that is set in a language setting in the operation unit.

Further features, aspects and embodiments of the present invention will become apparent from the following description of exemplary embodiments with reference to the attached drawings.

BRIEF DESCRIPTION OF THE DRAWINGS

FIG. 6A is a diagram schematically illustrating example correspondence between languages that are set in a language setting in the operation unit and character encoding schemes.

FIG. 6B is a diagram schematically illustrating example correspondence between languages specified as an initial value in the case of performing document name OCR and character encoding schemes.

FIG. 10 is a diagram illustrating example details of the send history screen in FIG. 9.

DESCRIPTION OF THE EMBODIMENTS

Hereinafter, numerous embodiments, features and aspects of the present invention will now herein be described with reference to the drawings.

Figure 1:
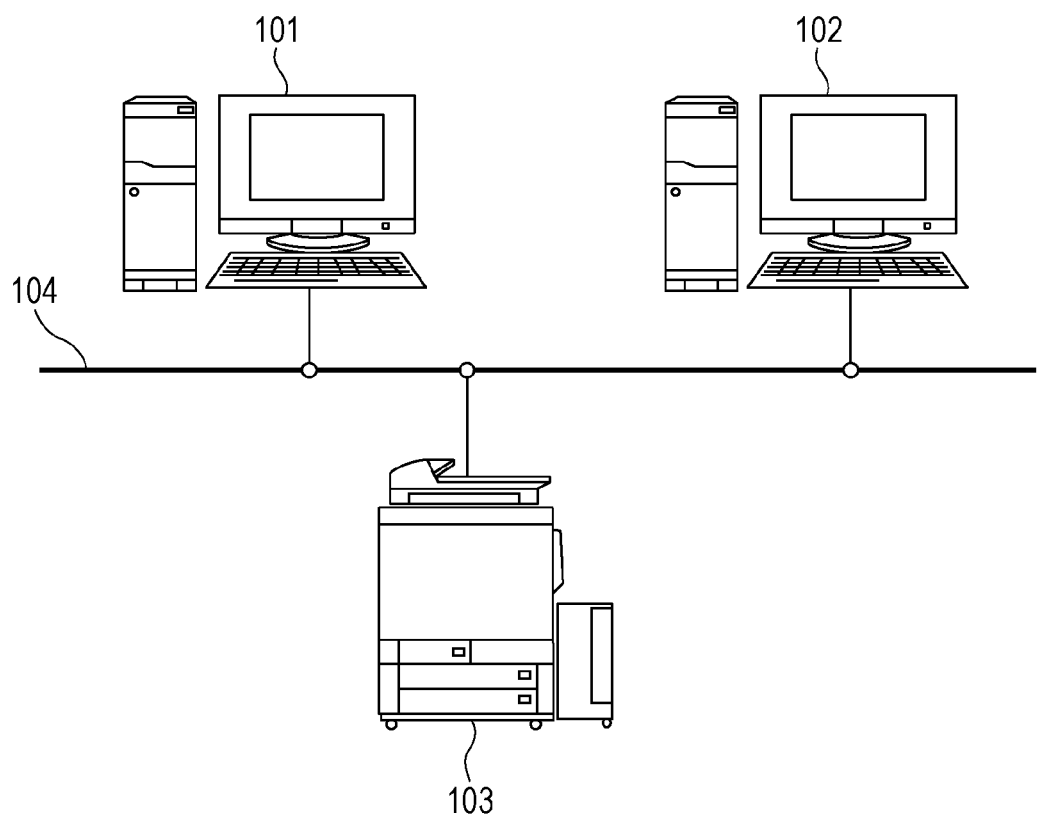
FIG. 1 is an example configuration diagram of a system including a digital MFP, which is an example of a data processing apparatus.

FIG. 1 is a diagram illustrating the configuration of an entire system according to this embodiment. In this system, a digital MFP 103, which is an example of a data processing apparatus, and a file sharing server 101 and a mail server 102, which are examples of an external apparatus, are connected to one another via a network 104. The digital MFP 103 has various image processing functions, such as an image reading function, an image sending function, and an image forming (printing) function. The file sharing server 101 is a computer operating as a file server that manages files on the network 104 in accordance with a file sharing protocol, such as SMB or WebDAV. The mail server 102 is a computer that sends and receives a mail in accordance with an electronic mail protocol, such as SMTP or POP.

In this embodiment, description will be given of an example in which electronic document data generated by scanning an original using the digital MFP 103 is sent as a file to the file sharing server 101 in accordance with a protocol, such as SMB, or is sent to the mail server 102 by being attached to an electronic mail.

Figure 2:
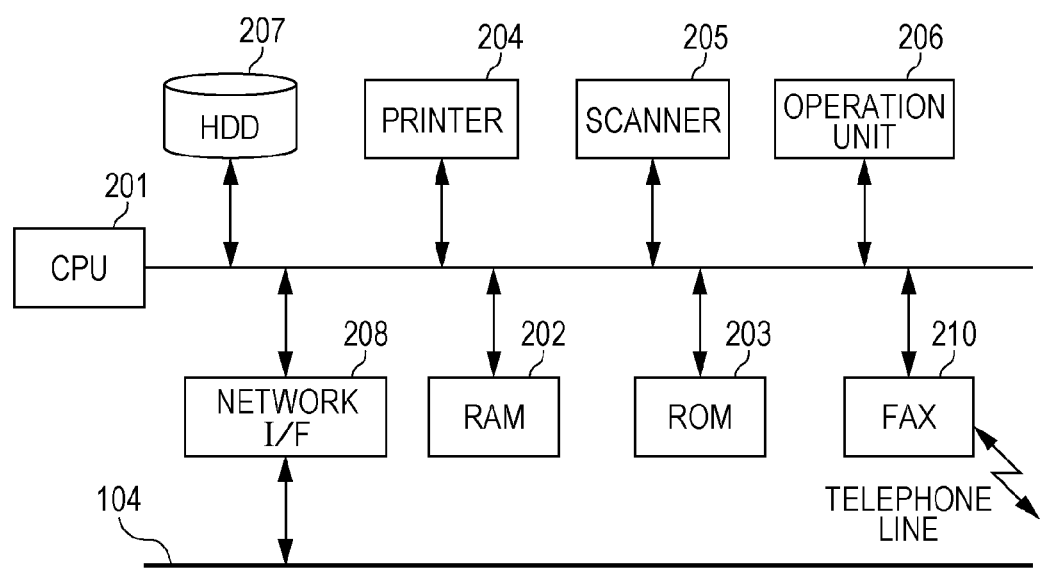
FIG. 2 is a diagram illustrating an example hardware configuration of the digital MFP in FIG. 1.

FIG. 2 is a diagram illustrating a hardware configuration of the digital MFP 103 illustrated in FIG. 1. The digital MFP 103 includes a CPU 201 that controls the entire apparatus, and a RAM 202 that provides a work area for the CPU 201. System programs and application programs are stored in the ROM 203. The applications stored in the ROM 203 include an application of performing OCR on document data input through a scanner 205 and extracting a character string.

Furthermore, the digital MFP 103 includes the scanner 205 that reads an original image, and a printer 204 that prints an image on the basis of document data input from the scanner 205 or data input via a network interface 208. Furthermore, the digital MFP 103 includes an HDD 207 that stores data, various setting parameters, and document data. Furthermore, the digital MFP 103 includes an operation 206 (touch panel or the like), in which an input device for receiving an operation from a user and a display device for displaying an operation screen displayed to enable operation of the input device are integrated together. The operation screen displayed on the operation unit 206 is displayed on the basis of the data of the operation screen stored in the ROM 203. The data of the operation screen is stored in the ROM 203 or the HDD 207 in units of languages described below. When a user selects any one of the languages via the operation unit 206, the data of the operation screen corresponding to the language is read out and is displayed on the operation unit 206.

Furthermore, the digital MFP 103 includes the network interface 208 that performs network communication with the file sharing server 101, the mail server 102, and other external apparatuses.

Figure 3:
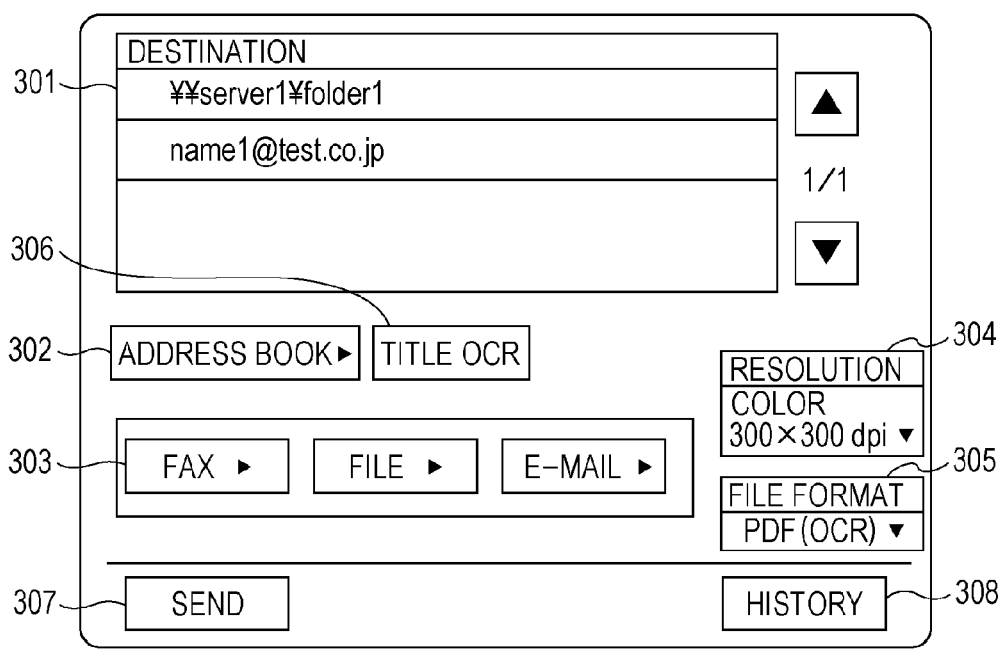
FIG. 3 is a diagram illustrating an example of a send setting screen displayed on an operation unit of the digital MFP in FIG. 1.

FIG. 3 is a diagram illustrating an example of a send setting screen displayed on the operation unit 206 in FIG. 2. As a result of providing an instruction to read an original and send document data using the send setting screen in FIG. 3, the digital MFP 103 sends electronic document data generated through scanning by the scanner 205 to the file sharing server 101 or the like via the network 104.

Upon pressing of an address book button 302, address book data stored in the HDD 207 is read out and selected, and then destinations of the document data are displayed on a destination screen 301. By selecting any of "fax", "file", and "e-mail" using a new destination button 303 and arbitrarily inputting a destination using the operation unit 206, a user can send the document data even to a destination included in address book data that is not stored in the HDD 207. A destination that is set by pressing the new destination button 303 is displayed on the destination screen 301, as in a case where setting is performed using the address book button 302.

A resolution setting button 304 enables setting of the resolution (for example, 200 dpi) of a document to be scanned.

A press of a document name OCR 306 (also referred to as title OCR) makes the setting of document name OCR valid. After the setting has become valid, the digital MFP 103 performs OCR (Optical Character Recognition) on electronic document data generated through scanning. Then, the digital MFP 103 extracts a character string from the document data, and sets a document name including the extracted character string for the document data.

Figure 4:
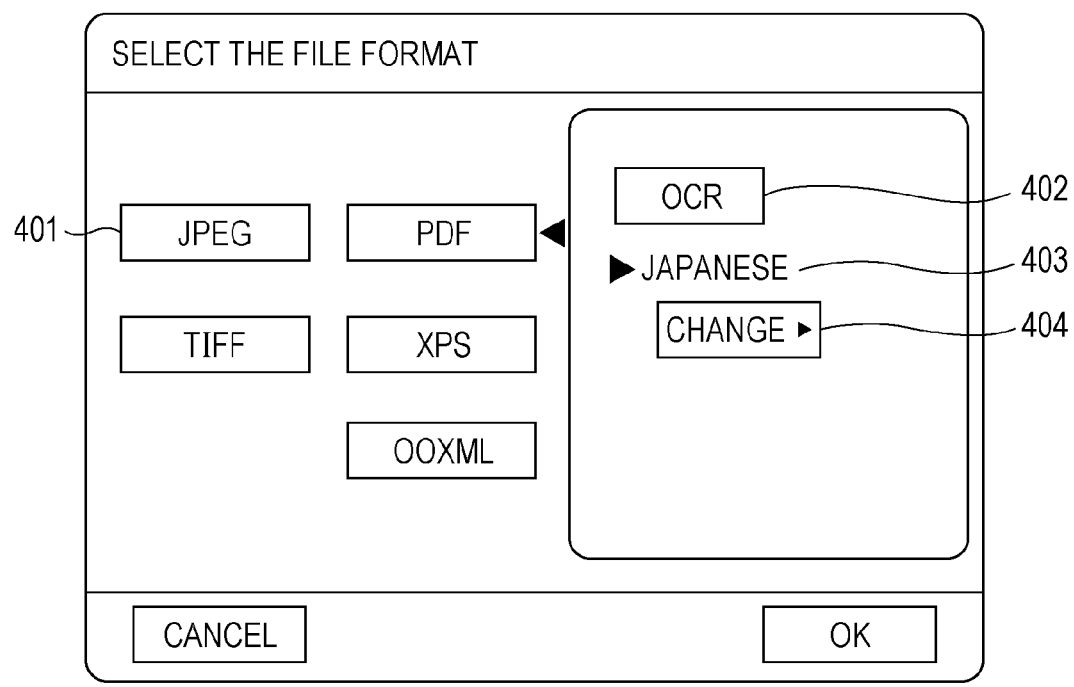
FIG. 4 is a diagram illustrating an example of a screen used for selecting a file format of document data to be sent.

A press of a file format button 305 causes a screen for selecting a file format in FIG. 4 to be displayed.

FIG. 4 illustrates a screen that is displayed upon pressing of the file format button 305 in FIG. 3 and that is used for selecting a file format of document data. One of the file formats listed in a file format 401 (JPEG, TIFF, PDF, XPS, and OOXML) can be selected. Upon pressing of an OK button on the screen in FIG. 4, the set value is stored in the RAM 202. A press of a cancel button makes the set value invalid.

When a file format compatible with OCR, that is, a file format of any one of PDF, XPS, and OOXML, is selected in the file format 401, a pop-up screen illustrated on the right side of the screen in FIG. 4 is displayed. On the pop-up screen, an OCR setting button 402 for setting whether or not OCR (character recognition) is to be performed, an OCR language 403 indicating the type of language (language) used in OCR, and a change button 404 for changing the OCR language 403 are displayed. Upon pressing of the OCR setting button 402, OCR is performed, with the language displayed in the OCR language 403, on the electronic document data generated through scanning. In this embodiment, the same language as the language that is set in the language setting in the operation unit 206 is set as an initial value in the OCR language 403. In the example in FIG. 4, the language that is set in the language setting in the operation unit 206 is English. Thus, English is set as an initial value also in the OCR language 403. However, the language that is set in the language setting in the operation unit 206 cannot always be set as a language for OCR. In the case of a language that can be set as a language set in the language setting in the operation unit 206, but that cannot be set as an OCR language, another language is set as an initial value of the language for OCR.

FIGS. 6A and 6B schematically illustrate the correspondence between languages and character encoding schemes of the languages. The information about individual records illustrated in FIGS. 6A and 6B is stored in the HDD 207.

FIG. 6A illustrates the correspondence between a language used for display on the screen of the operation unit 206 (hereinafter referred to as "display language") 601 and a character encoding scheme 602 of the display language 601. FIG. 6B illustrates the correspondence between a language specified before performing OCR (hereinafter referred to as "OCR language") 603 and a character encoding scheme 604 of the OCR language 603. The display language 601 is a language that can be displayed on the operation unit 206 by the digital MFP 103. A screen is displayed on the operation unit 206 in accordance with a language that is set by a user from the list of the display language 601 on a language setting screen, which is not illustrated. The exemplary screens in FIGS. 3 to 5 are language setting screens, which are not illustrated, in which "Japanese" is set as a display language.

When "Japanese" is set to the display language 601, the OCR language 603 set as an initial value is "Japanese". When "English" is set to the display language 601, the OCR language 603 set as an initial value is "English".

Referring back to FIG. 4, the OCR language 403 set as an initial value in FIG. 4 can be changed by using the change button 404. A press of the change button 404 causes the screen in FIG. 5 to be displayed.

Figure 5:
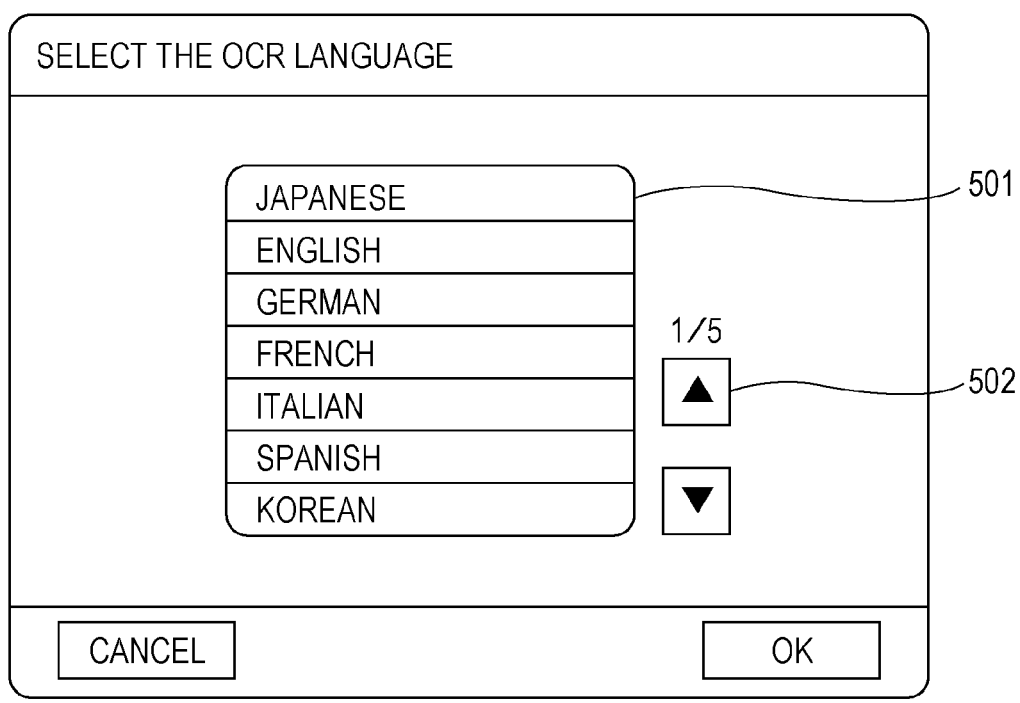
FIG. 5 is a diagram illustrating an example of a screen used for selecting a language that is specified in the case of performing document name OCR.

FIG. 5 illustrates an example of a screen used for selecting an OCR language. A list of OCR languages compatible with the digital MFP 103 is read from the HDD 207 and is displayed in a field 501. When a user selects a desired language as an OCR language and presses an OK button, the digital MFP 103 stores the value set on the screen in FIG. 5 into the RAM 202.

Figure 7:
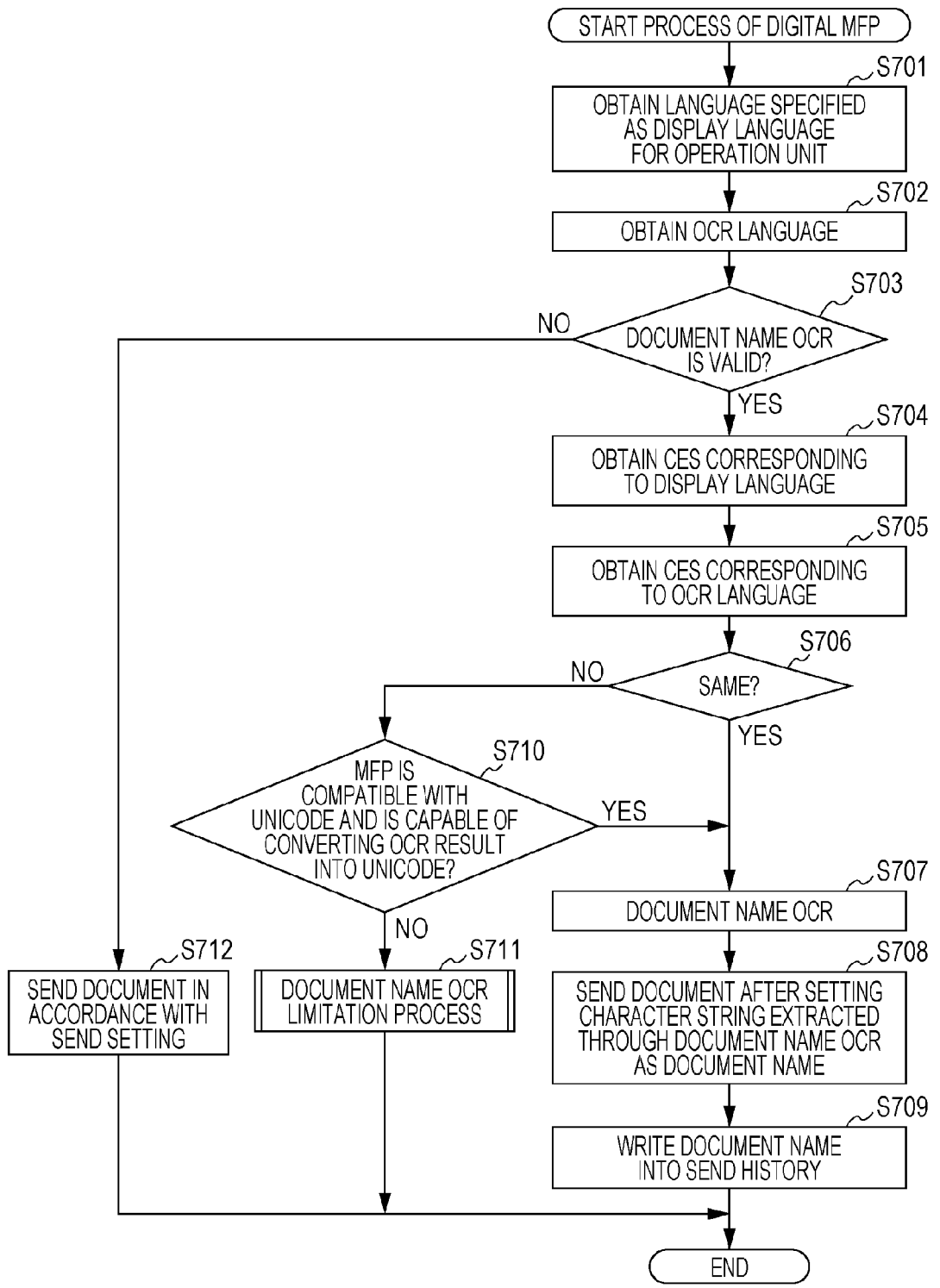
FIG. 7 is a flowchart illustrating an example process executed by the digital MFP in FIG. 1 upon a send button being pressed on the send setting screen in FIG. 4.

After the above-described settings have been performed on the screens in FIGS. 3 to 5 and a send button 307 in FIG. 3 has been pressed, the process of the flowchart in FIG. 7 is started, and the digital MFP 103 sends document data in accordance with the above-described settings.

FIG. 7 is a flowchart illustrating the process of the digital MFP 103 according to this embodiment. A program for executing individual steps in the flowchart in FIG. 7 is stored in the HDD 207. The program is loaded to the RAM 202 and is executed by the CPU 201.

In S701, the CPU 201 obtains a display language specified as a display language for the operation unit 206. For example, when the screens in FIGS. 3 to 5 (screens on which characters are displayed in English) are displayed, information about "English" is obtained as a display language.

If setting has been performed so that OCR is to be performed on document data, the specification of an OCR language is obtained in S702. For example, if "Japanese" is specified in the OCR language 403 as in the screen in FIG. 4, "Japanese" is obtained as an OCR language. In the case of performing OCR, OCR is performed using the language obtained in S702. Accordingly, character recognition accuracy can be increased compared to a case where no language is specified before performing OCR.

In S703, the CPU 201 determines whether or not a character string recognized in OCR is to be set as a document name (whether or not document name OCR is to be performed). Specifically, if the setting of the document name OCR 306 in FIG. 3 is set to ON and if the setting of the OCR (character recognition) in FIG. 4 is set to ON, the CPU 201 determines to perform document name OCR. If the setting of the document name OCR 306 is set to OFF, or if the setting of the document name OCR 306 is set to ON and the setting of the OCR setting button 402 is set to OFF, the CPU 201 determines not to perform document name OCR. If the CPU 201 determines not to perform document name OCR (NO in S703), the process proceeds to S712, and normal send processing is performed. If the CPU 201 determines to perform document name OCR (YES in S703), the process proceeds to S704.

In S704, the CPU 201 obtains, from the table in FIG. 6A, the character encoding scheme corresponding to the display language received in S701. For example, if "English" is set as a display language, as in the screens in FIGS. 3 to 5, the CPU 201 obtains the character encoding scheme Windows-1252 from the table in FIG. 6A.

In S705, the CPU 201 obtains, from the table in FIG. 6B, the character encoding scheme of the language specified as the OCR language 403. For example, if "Japanese" is specified as an OCR language, as in the screen in FIG. 4, the CPU 201 obtains the character encoding scheme Shift_JIS from the table in FIG. 6B.

In S706, the CPU 201 compares the character encoding scheme (also referred to as encoding scheme) obtained in S704 with the character encoding scheme obtained in S705, and determines whether or not both the character encoding schemes are the same. If it is determined in S706 that the character encoding schemes are the same (YES in S706), the CPU 201 performs OCR on the document data (S707). Then, the CPU 201 sets, as a document name, part of a character string extracted as a result of the OCR for the document data, and sends the document data to the apparatus indicated by a destination (S708).

In S706, the character encoding scheme of the display language and the character encoding scheme of the OCR language need not be completely the same. A determination "YES" may be performed in S706 if the character encoding scheme of the OCR language and the character encoding scheme of the display language are compatible with each other. For example, a character described in ASCII code can be correctly displayed without character garbling even when the character is displayed using the character encoding scheme Shift_JIS. Thus, ASCII is a character encoding scheme that is compatible with Shift_JIS.

In S706, the character encoding scheme of the display language is compared with the character encoding scheme of the OCR language. However, in order to perform more simplified control, languages may be compared with each other instead of comparing character encoding schemes. In the case of comparing languages with each other, when the display language is "English" and the OCR language is "French", for example, a determination "NO" is performed in S706 although both the character encoding schemes are the same (Windows-1252), and a document name OCR limitation process is performed. As a result of comparing the display language with the OCR language, character garbling can be prevented by performing a more simplified comparison process.

In S709, the CPU 201 writes the document name set in S708 into the HDD 207, the document name serving as part of send history information.

Figure 8:
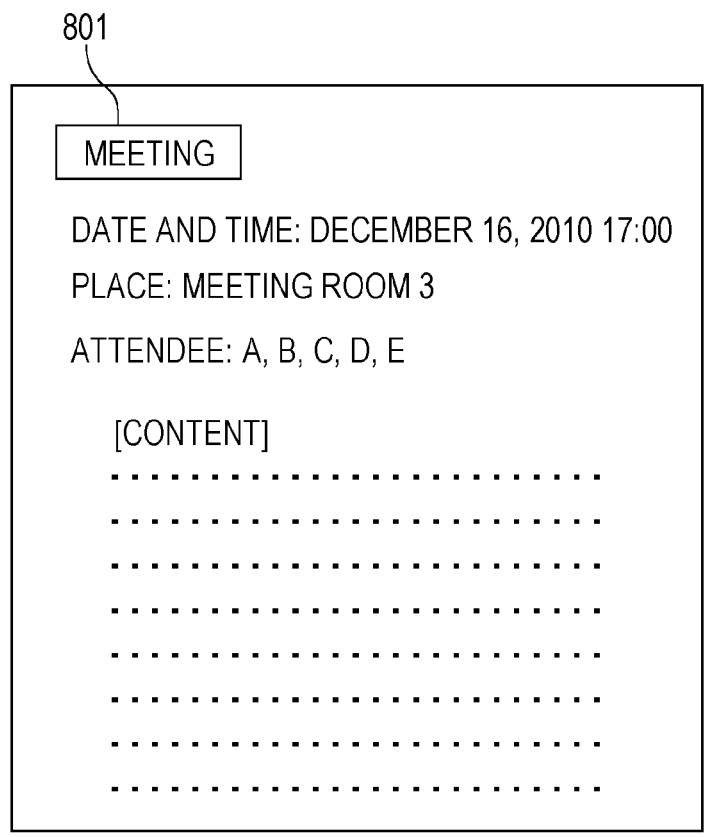
FIG. 8 is an example image diagram illustrating a character string recognized in document name OCR.

FIG. 8 illustrates an original image on which a character string, which is to be extracted when document name OCR is performed in S707, is printed.

After the character string in a region 801 illustrated in FIG. 8 is extracted as a result of OCR, a document name "MEETING" is set for the document data obtained through scanning, and the document data is sent. Furthermore, when the screens of a send history in FIGS. 9 and 10, which will be described below, are displayed, a character string "DOCUMENT NAME: MEETING" is displayed.

Figure 9:
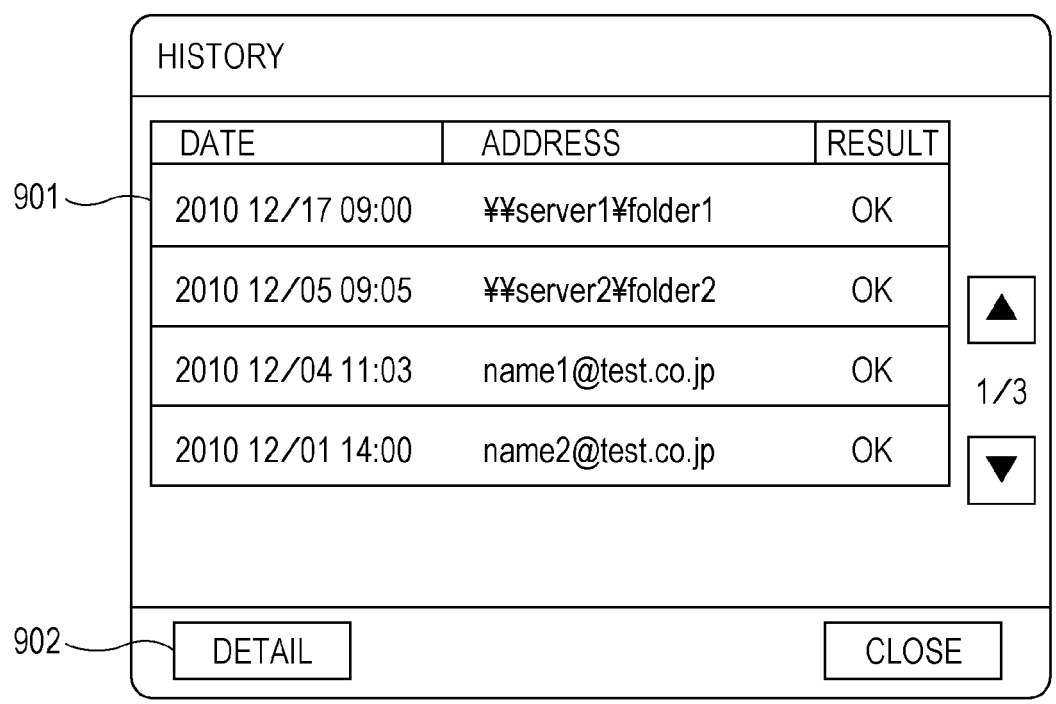
FIG. 9 is a diagram illustrating an example of a send history screen displayed upon a send history button being pressed on the send setting screen in FIG. 4.

FIG. 9 illustrates an example of a send history screen. The screen in FIG. 9 is displayed upon the send history button 308 in FIG. 3 being pressed. Upon pressing of a detailed information 902 after the selection of one item from a list 901 in the send history, the detailed information of the send history in FIG. 10 is displayed. The items that can be displayed as the detailed information of the send history include a start time of sending, an end time of sending, a destination, a document name 1001, and a send size. FIG. 10 illustrates the details of the send history of a process of sending document data on which document name OCR is performed when the original image in FIG. 8 is scanned.

S710 is a process that is performed if it is determined in S706 that the character encoding scheme of the display language is different from the character encoding scheme of the OCR language 403. In S710, the CPU 201 determines whether or not the digital MFP 103 is capable of displaying characters on the operation unit 206 using character codes compatible with Unicode and converting a result of OCR into character codes compatible with Unicode. If the CPU 201 determines that the digital MFP 103 is capable of displaying characters on the operation unit 206 using character codes compatible with Unicode and converting a result of OCR into character codes compatible with Unicode (YES in S710), the process proceeds to S707. If the CPU 201 determines that the digital MFP 103 is incapable of displaying characters compatible with Unicode on the operation unit 206 or is incapable of converting a result of OCR into character codes compatible with Unicode (NO in S710), the process proceeds to the document name OCR limitation process in S711.

The details of the process in S711 will be described with reference to FIG. 11.

Figure 11:
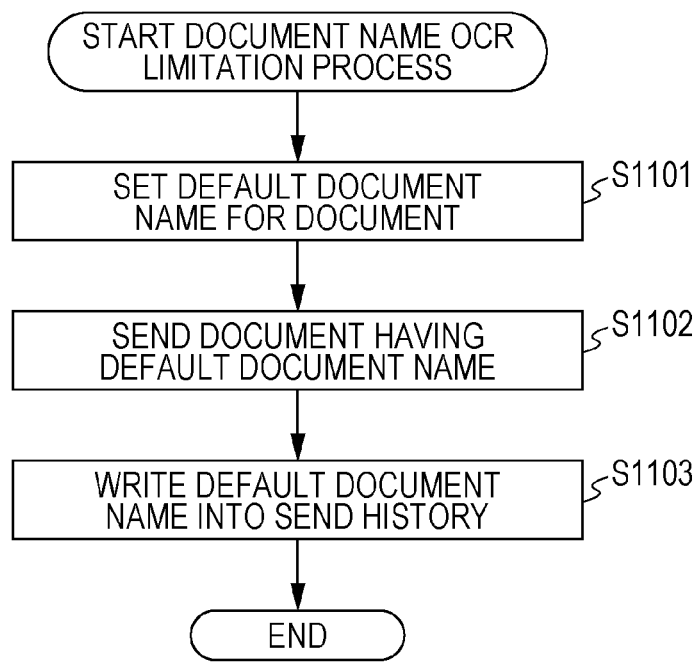
FIG. 11 is a flowchart describing example details of step S711 in FIG. 7 in a first embodiment.

FIG. 11 is a flowchart illustrating the details of the process in S711 in FIG. 7. In S1101, the CPU 201 performs OCR on electronic document data obtained through scanning, but does not set a character string recognized in the OCR as a document name. A default document name (i.e., a document name that is set when the document name OCR is OFF) is set as a document name for the document. Then, in S1102, the CPU 201 sends the document data for which the default document name has been set. After that, in S1103, the CPU 201 writes the default document name as a send history into the HDD 207, and ends the process of this flowchart. The default document name is a document name that does not cause character garbling and that is set in accordance with a predetermined rule in the digital MFP 103. In this embodiment, a document name such as "year, month, date, hour, minute, and second (e.g.: 20101001170023)" described in ASCII code is set.

Alternatively, a document name in a character encoding scheme that is set in the language setting in the operation unit 206 may be set. In this case, if English is set in the language setting in the operation unit 206, for example, a character string according to the character encoding scheme Windows-1252 is set as a document name.

In the case of displaying the send history of the document data sent in S1102 on the send history screen in FIG. 10, document data having a default document name set thereto, instead of an OCR result set thereto, is sent. Accordingly, a document name corresponding to a character encoding scheme in which character garbling can occur is not displayed on the operation unit 206.

At the time of setting a default document name in S1101, a warning message such as "setting of document name OCR is canceled" may be displayed on the operation unit 206.

According to this embodiment, when the character encoding scheme of the display language that is set on a language setting screen (not illustrated) of the operation unit 206 is different from the character encoding scheme of the OCR language 403, document name OCR is not performed even if the setting of document name OCR is valid. That is, a character string extracted as a result of OCR is not set as a document name. Instead, document data is sent by setting a default document name therefor. As a result, character garbling of a document name that is set for document data to be sent displayed on the send history screen can be prevented.

In this embodiment, it is determined in S706 whether the character encoding scheme of the display language and the character encoding scheme of the OCR language are the same or different. However, according to a modification, instead of performing the above-described determination process, it may be determined in S706 whether or not the codes of characters recognized in document name OCR are assigned to the character encoding scheme of the display language obtained in S704.

In this embodiment, when the character encoding scheme corresponding to the display language that is used for displaying a screen on the operation unit 206 is different from the character encoding scheme corresponding to the OCR language 403, a result of OCR is not used as a document name, but a default document name is set for document data. However, according to a modification, an OCR result is set as a document name, but the set document name is not written into a send history. Accordingly, the above-described problem, that is, display of a document name that can cause character garbling on the operation unit 206, can be solved.

For example, in S1101, a character string obtained through document name OCR (not a default document name) is set as a document name for document data. In S1102, the document data having the document name that has been set through the document name OCR is sent. Then, in S1103, control is performed so that information about the document name that has been set through the document name OCR is not written into the HDD 207.

According to the first embodiment, when the character encoding scheme of a display language is different from the character encoding scheme of an OCR language, document name OCR is not performed, and document data is sent after setting a default document name therefor. According to the second embodiment, sending of document data is not performed, thereby preventing sending of document data for which a document name has been set against an instruction provided by a user.

The second embodiment is common to the above-described first embodiment in terms of FIGS. 1 to 7, and thus the description thereof is omitted.

Figure 12:
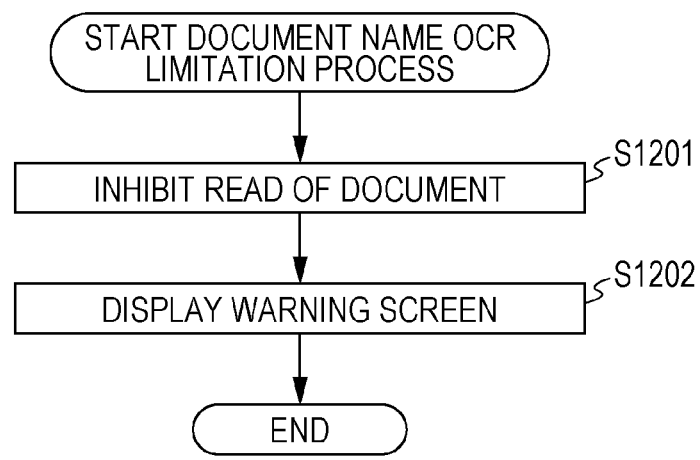
FIG. 12 is a flowchart describing example details of step S711 in FIG. 7 in a second embodiment.

FIG. 12 is a flowchart describing the detail of S711 in FIG. 7 according to the second embodiment.

Figure 13:
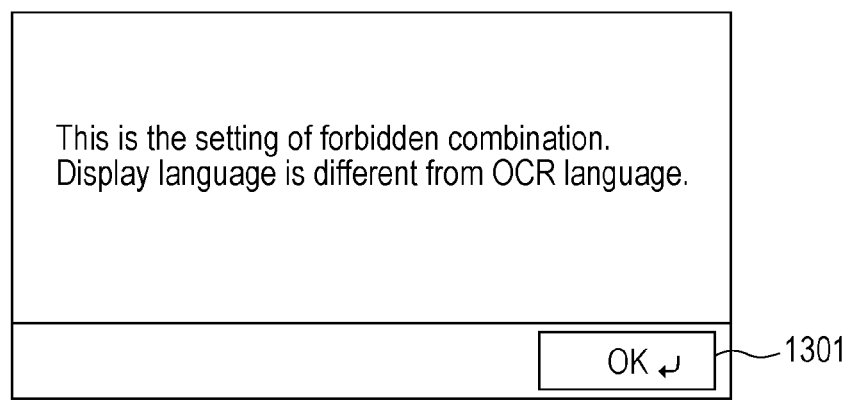
FIG. 13 is a diagram illustrating an example of a warning screen displayed when a character encoding scheme of a language that is set in the language setting in the operation unit is different from a character encoding scheme of a language in a case where OCR is performed.

In S1201, the CPU 201 stops a read process based on the settings received on the screens in FIGS. 3 to 5. In S1202, the CPU 201 displays the warning screen illustrated in FIG. 13 on the operation unit 206. As a result, the CPU 201 performs control so that a send process cannot be executed even if the send button 307 is pressed.

According to this embodiment, when the character encoding scheme of a display language is different from the character encoding scheme of an OCR language, execution of a process of sending document data is inhibited. Accordingly, display of a garbled document name on the send history screen can be prevented, and also sending of document data having a document name that has been set against an instruction provided by a user can be prevented. Furthermore, a warning screen can be displayed to notify a user of the fact.

The present invention may also be realized through the execution of the following process, i.e., the process of supplying software (program) that realizes the functions of the above-described embodiments to a system or apparatus via a network or various types of storage media (for example, a non-transitory computer readable medium), and reading and executing the program by a computer (or CPU, MPU, or the like) of the system or apparatus.

According to the present invention, character garbling, which can occur when a document name of a character string obtained through character recognition in a specified language is displayed on a display unit, can be prevented.

The present invention is not limited to the above-described embodiments, and various changes and modifications can be made without deviating from the sprit and scope of the present invention. Thus, the following claims are attached to reveal the scope of the present invention.

This application claims the benefit of International Patent Application No. PCT/JP2011/059564, filed Apr. 18, 2011, which is hereby incorporated by reference herein in its entirety.

What is claimed is:

1. A data processing apparatus comprising:
an input unit configured to input document data;
a character recognition unit configured to perform, on the document data input by the input unit, character recognition using a specified language;
a document name setting unit configured to set, as at least part of a document name of the document data input by the input unit, a character string recognized by the character recognition unit;
a display unit configured to display, on an operation unit, the document name set by the document name setting unit; and
a control unit configured to restrain the display unit from displaying the document name including the character string set by the document name setting unit, when a character encoding scheme specified in a case where character recognition is performed by the character recognition unit is a character encoding scheme incompatible with a character encoding scheme of a language that is set in a language setting in the operation unit.

2. The data processing apparatus according to claim 1, wherein the control unit inhibits the document name setting unit from setting the document name including the character string, thereby restraining display of the document name including the character string.

3. The data processing apparatus according to claim 1, wherein the control unit performs control so that the document name setting unit sets, as a document name, a character string based on the character encoding scheme of the language that is set in the language setting in the operation unit, thereby restraining the display unit from displaying the document name including the character string recognized by the character recognition unit.

4. The data processing apparatus according to claim 1, wherein the control unit performs control so that the document name setting unit sets a document name in ASCII code, thereby restraining the display unit from displaying the document name including the character string recognized by the character recognition unit.

5. The data processing apparatus according to claim 1, further comprising a sending unit configured to send the document data input by the input unit to an external apparatus.

6. The data processing apparatus according to claim 5, wherein the display unit displays, in a case where the sending unit has sent the document data, a document name set for the document data, the document name being included in a send history.

7. The data processing apparatus according to claim 1, wherein a language in a case where the character recognition unit performs character recognition is input by a user.

8. The data processing apparatus according to claim 1, wherein a character encoding scheme compatible with the character encoding scheme of the language that is set in the language setting in the operation unit is a character encoding scheme that does not cause character garbling even if display is performed using the character encoding scheme of the language that is set in the language setting in the operation unit.

9. The data processing apparatus according to claim 8, wherein the character encoding scheme compatible with the character encoding scheme of the language that is set in the language setting in the operation unit is a character encoding scheme that is the same as the character encoding scheme of the language that is set in the language setting in the operation unit.

10. A method for controlling a data processing apparatus, comprising:
an input step of inputting, with an input unit, document data;
a character recognition step of performing, with a character recognition unit, on the document data input by the input unit, character recognition using a specified language;
a document name setting step of setting, as at least part of a document name of the document data input by the input unit, a character string recognized by the character recognition unit;
a display step of displaying, on an operation unit, the document name set in the document name setting step; and
a control step of restraining display of the document name including the character string set in the document name setting step on the operation unit, when a character encoding scheme specified in a case where character recognition is performed in the character recognition step is a character encoding scheme incompatible with a character encoding scheme of a language that is set in a language setting in the operation unit.

11. A non-transitory computer readable storage medium containing computer-executable instructions for controlling a data processing apparatus, the medium comprising:
computer-executable instructions for inputting document data via an input unit;
computer-executable instructions that perform character recognition, via a character recognition unit, on the input document data, character recognition using a specified language;
computer-executable instructions that set, as at least part of a document name of the input document data, a character string recognized by the character recognition unit;
computer-executable instructions that display, via an operation unit, the at least part of the set document name; and
computer-executable instructions that control restraining the display of the at least part of the document name, including the set character string, when a character encoding scheme specified in a case where character recognition is performed is a character encoding scheme incompatible with a character encoding scheme of a language that is set in a language setting in the operation unit.

* * * * *